United States Patent [19]

Chiang

[11] Patent Number: 4,722,600
[45] Date of Patent: Feb. 2, 1988

[54] APPARATUS AND METHOD FOR MEASURING STRAIN

[76] Inventor: Fu-Pen Chiang, 27 Cove La., Port Jefferson, N.Y. 11777

[21] Appl. No.: 918,522

[22] Filed: Oct. 14, 1986

[51] Int. Cl.$^4$ ............................................. G01B 11/14
[52] U.S. Cl. ...................................... 356/32; 356/374; 250/231 R; 250/237 G; 73/800
[58] Field of Search ......................... 356/32, 374, 375; 250/231 R, 231 SE, 237 G; 73/800

[56] References Cited

U.S. PATENT DOCUMENTS

| | | | |
|---|---|---|---|
| 3,768,911 | 10/1973 | Erickson | 356/374 |
| 4,014,613 | 3/1977 | Sharp, Jr. et al. | 356/32 X |
| 4,050,818 | 9/1977 | Sharp, Jr. et al. | 356/32 |
| 4,051,483 | 9/1977 | Suzuki | 356/374 |
| 4,079,252 | 3/1978 | Brake | 356/374 X |
| 4,127,109 | 11/1978 | Fourney et al. | 356/32 X |
| 4,525,858 | 6/1985 | Cline et al. | 356/374 X |
| 4,560,280 | 12/1985 | Iwamoto et al. | 356/374 X |
| 4,678,948 | 7/1987 | Schmitt | 250/237 G X |
| 4,684,257 | 8/1987 | Hanaoka et al. | 250/237 G X |

OTHER PUBLICATIONS

Chiang, F. "Moiré Methods of Strain Analysis" SESA's *Manual on Experimental Stress Analysis*, Third Edition, Ch. 6, Mar. 1978.

*Primary Examiner*—Eugene R. LaRoche
*Assistant Examiner*—David Mis
*Attorney, Agent, or Firm*—Erwin S. Teltscher

[57] ABSTRACT

Two electro-moire systems provide strain values directly. By shifting a reference grating relative to a specimen grating along the direction perpendicular to the grating line the resulting moire fringes sweep across the field. In one method two photo-detectors are used to record the cyclic intensity signals. The phase difference between the two signals is used in a special formula for the calculation of strain. In the other method only one photo-detector is used, and the frequency information of the cyclic signal is used in another formula for the calculation of strain. The electrical signals from photo-detectors are converted into digital signals and processed using a digital computer through FFT (Fast Fourier Transformer) to eliminate noise. Strain-values as small as one microstrain can be measured.

12 Claims, 7 Drawing Figures

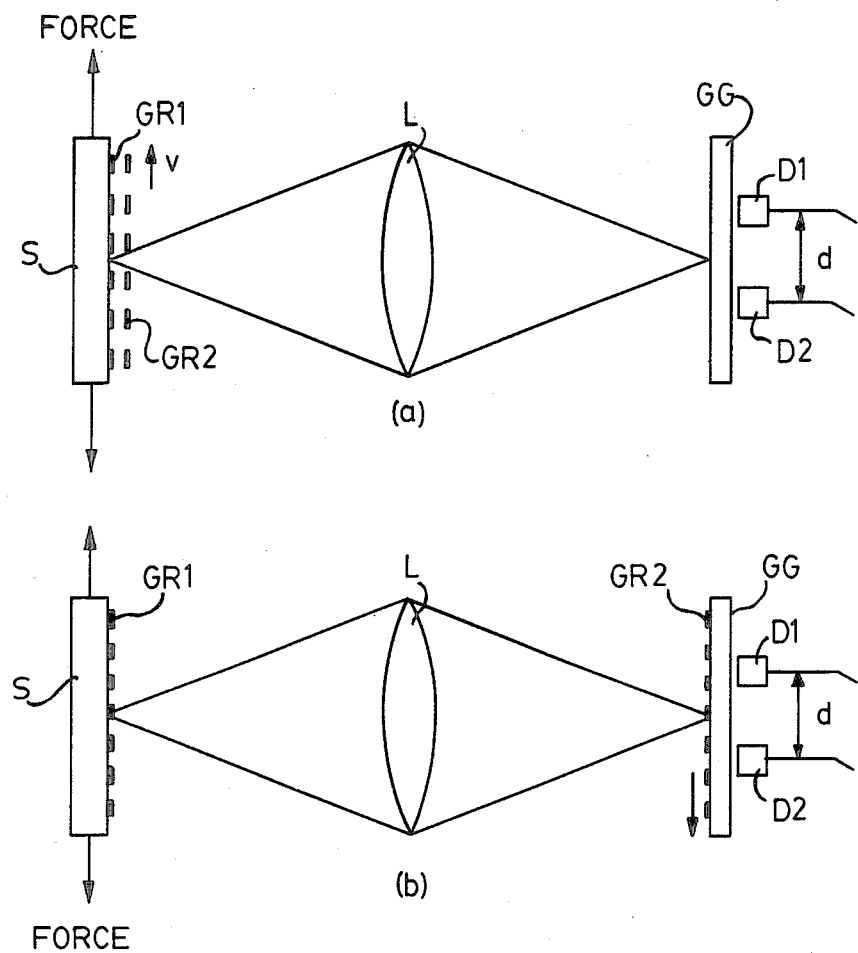
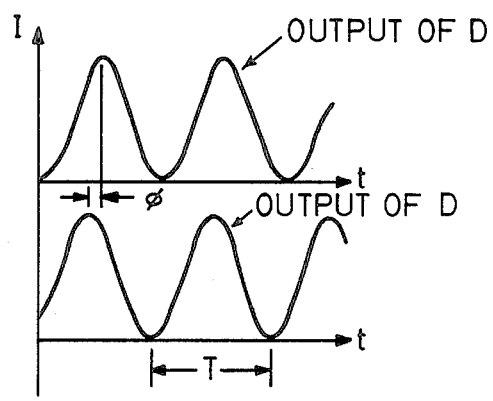
FIG. 1
FIG. 2

APPARATUS AND METHOD FOR MEASURING STRAIN

BACKGROUND OF THE INVENTION

The prevailing strain measuring device today is the electrical resistance strain gage. It is made of metallic foil in the form of a geometric pattern. When cemented onto a surface undergoing mechanical stress or strain, the gage's resistance change is read by an instrument such as Wheatstone bridge and the value converted back to strain. It is a contact method in that lead wires are needed to monitor the resistance change. The invention relates to two noncontact stain measuring methods using moire fringes. The traditional moire method of strain measurement uses the fringe spacing (or the gradient of fringe position) as a parameter for calculating the strain. This traditional method is described in several references, such as the 3rd edition of the Society of Experimental Mechanics, Manual on Experimental Stress Analysis, March, 1978-Chapter 6-"Moire Methods of Strain Analysis"-by Fu-Pen Chiang, the applicant of the present invention, Moire Analysis of Strain, by A. J. Durelli & V. J. Parks, Prentice Hall, Inc., 1970, and Moire Fringes in Strain Analysis, by P. S. Theocaris, Pergamon Press, Inc., 1969.

Commonly moire fringes are also used for metrological measurements, such as motion and position, taught in U.S. Pat. No. 3,768,911, displacement, taught in U.S. Pat. No. 4,079,252, or three-dimensional configurations of an object, taught in U.S. Pat. Nos. 4,051,483 and 4,525,858. All these methods are conceptually different from the measurement of strain described hereinbelow.

SUMMARY OF THE INVENTION

When two gratings (a grating is a geometric pattern of alternating dark and bright straight strips of constant period or pitch printed on a film or glass substrate) of slightly different pitch or orientation, or both are superimposed, an interference pattern called "moire pattern" is created. This pattern is in the form of a spatial wave consisting of dark and bright fringes whose intensity profile is nearly sinusoidal (or cosinusoidal). When one of the gratings is sifted along the direction perpendicular to the grating lines, the moire fringe also shifts, but with an enhanced speed. If a small difference in pitch between the gratings is due to the fact that one of them has experienced a mechanical strain, the mechanical strain can be delineated by determining the phase difference between two points of the sweeping moire fringes, or the frequency of the moire fringe at one point. In actual application one of the gratings is cemented or otherwise engraved onto the specimen surface (or interior thereof) and subjected to mechanical strain. A reference grating is then superimposed onto the specimen grating to form moire fringes. The superposition can be either by direct physical contact (or near contact, such as juxtaposition) or brought about by an optical imaging system. In the phase method two photo-detectors are used. Sweeping moire fringes are obtained by shifting the reference grating along a direction perpendicular to the grating lines, while the specimen grating and the detectors stay fixed in space. In the frequency method only one photo-detector is employed. Sweeping moire fringes are realized by moving the single detector and the reference grating as a whole. The phase or the frequency information of the sweeping moire fringes is read either from the traces of these signals on an oscilloscope, or by an electronic phase meter or frequency counter, or is digitized and fed into an electronic computer for digital processing, using FFT (fast Fourier transform).

BRIEF DESCRIPTION OF THE DRAWING

FIG. 1a is a schematic diagram of a first embodiment of the present invention;

FIG. 1b is a variant of the aforedescribed first embodiment of the invention;

FIG. 2 shows the output of the detectors of FIGS. 1a or 1b;

DETAILED DESCRIPTION OF THE PREFERRED EMBODIMENTS

FIG. 1 is a schematic of the phase method. In FIG. 1(a) the specimen grating GR1 is cemented or engraved onto the specimen surface which is undergoing mechanical stress. A reference grating GR2 of a structure substantially similar to that of the reference grating is mounted on a mechanical device, such as a stage movable in translatory motion, controlled, for example, by a stepping motor, and placed in parallel in contact (or near contact, such as being juxtaposed) with the specimen grating. Illumination of the gratings is provided by a (non-illustrated) DC light source, and this light source may be situated on either side of the respective gratings. The resulting moire fringes are imaged via a lens L onto a ground glass GG. Two photo-detectors D1 and D2 separated by a distance d are mounted behind the ground glass. When the reference grating GR2 is shifted in its plane with a constant velocity v, and along a direction perpendicular to the grating lines, moire fringes sweep across the two detectors, whose respective outputs (i.e. intensity vs. time) are in the form of sinusoidal waves as shown in FIG. 2, and there is a phase difference $\phi$ between the two waves.

FIG. 1b depicts a different optical arrangement where the two gratings are separated by a large distance. The specimen and reference gratings GR1 and GR2 are located at the object and image planes of the photographic lens L, respectively; the reference grating GR2 is also in direct contact with the ground glass GG. The two photo-detectors D1 and D2 separated by the distance d are placed behind the ground glass. A mechanical device is provided to shift either the reference grating GR2 or the reference grating-ground glass assembly (the reference grating GR2 mounted on the ground glass) without disturbing the detectors.

For simplicity of description the magnification of the imaging system is assumed to be unity. (For other magnifications proper correction factors are added). From the phase difference $\phi$ of the two signals the strain value e, averaged over the distance between the detectors at the corresponding locations on the specimen surface is calculated using the following equation $$e = p\phi/360d$$

where p is the pitch of the reference grating, (and of the specimen grating when no strain is applied) and d the distance between the detectors D1 and D2.

Figure 3:
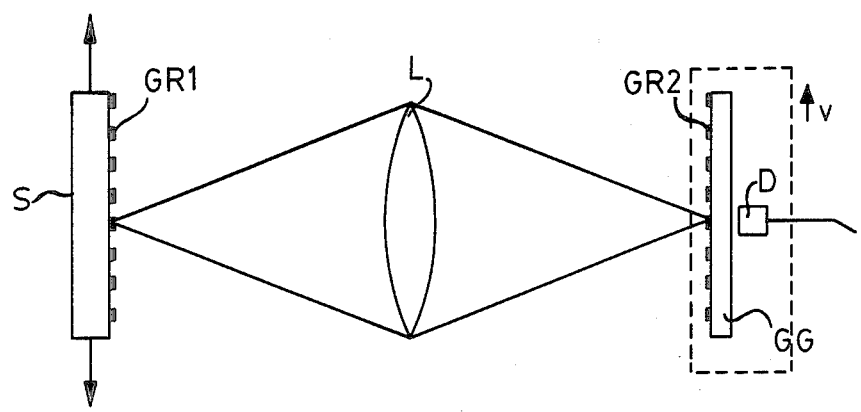
FIG. 3 is a schematic diagram of a second embodiment of the present invention.
Figure 4:
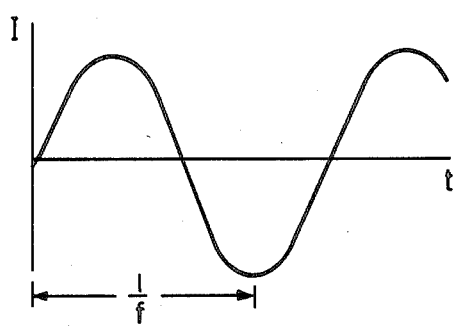
FIG. 4 shows the output of the detector of FIG. 4.

FIG. 3 is a schematic of the frequency method of detecting strain. The optical arrangement is similar to that shown in FIG. 1(b), except as follows: instead of two photodetectors, only one photo-detector is used. Furthermore the reference grating GR2, the ground glass GG and the photodetector D are rigidly mounted together, so that the entire assembly moves as one unit. When the assembly is shifted with a constant velocity v along a direction perpendicular to the grating lines, moire fringes sweep across the sole photo-detector. The output is again a waveform of light intensity vs. time as shown in FIG. 4. It has a characteristic frequency f. Strain e at the point on the specimen surface corresponding to the detector position is obtained using the following formula $$e = 1 - fp/v = 1 - f/f_o = 1 - T_o/T$$

where p is the pitch of the reference grating (and specimen grating when no strain is applied thereto), v the velocity of the grating-ground glass-detector assembly, $f_o$ the frequency of the moire signal, when the specimen experiences no strain or some initial strain, and f the frequency of the moire signal when the specimen experiences an actual strain due to an applied load. $T_o$ and T are the periods of the signals corresponding to $f_o$ and f, respectively.

Figure 5:
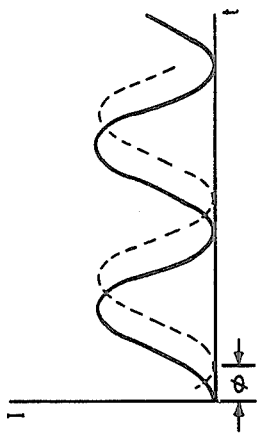
FIG. 5 is a perspective view of another variant of the first embodiment.
Figure 5:
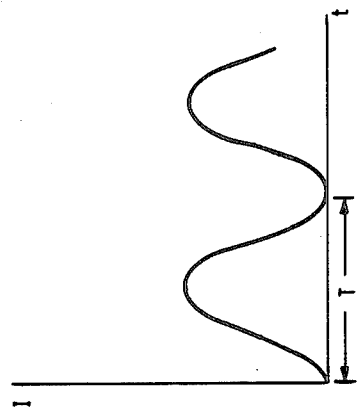
Figure 5:
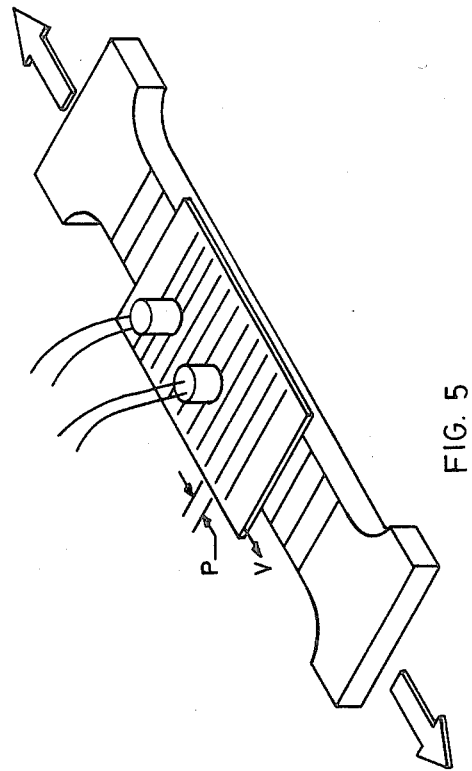
Figure 6:
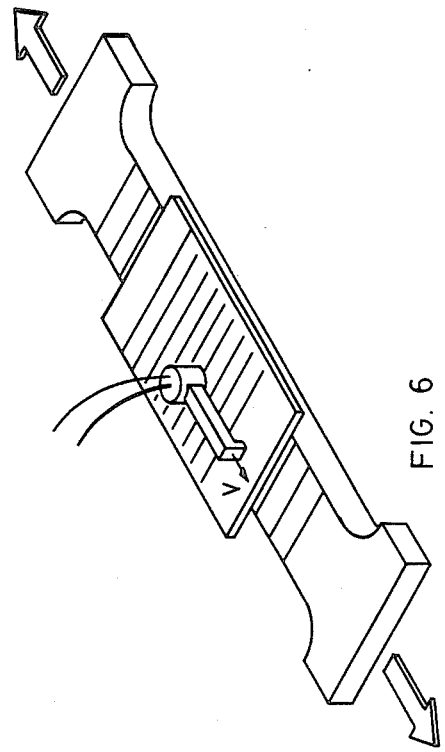
FIG. 6 is a perspective view of a variant of the second embodiment of the present invention.

FIGS. 5 and 6 are two different embodiments of the two basic methods described before. In these cases the imaging system is eliminated and the detector or detectors are directly placed behind the grating or gratings.

The phase difference $\phi$ or the frequency value f ( or $f_o$) can be read by a variety of means. The simplest is to measure these parameters directly from oscilloscope traces. Or they can be read by an electronic phase meter or frequency counter. For precision work the outputs from the detectors are converted into digital form using an analog-to-digital converter. The digitized signals are then fed into an electronic computer. Numerical digital filtering techniques are used to enhance the signal-to-noise ratio of the signals. One scheme is to perform a FFT (fast Fourier transform) of the signals to obtain their frequency spectra. For the phase method, both the amplitude vs. frequency and phase vs. frequency distributions for both signals are obtained. The peak values of the amplitude vs. frequency distributions are used to locate the proper respective phase values, and their difference is used for the calculation of strain. In the frequency method the peak value of amplitude vs. frequency distribution is used for the calculation of strain.

By using the FFT (fast Fourier transform) method to process the experimental data, strain as small as one microstrain has been obtained.

I claim:

1. In a method of measuring strain with the aid of a first grating applied onto a surface of a specimen to which a stress is applied, said first grating having alternating dark and bright strips of approximately constant pitch, said strips extending along a predetermined direction, a second grating of a structure substantially similar to that of said first grating, a light source illuminating said gratings, and one photodetector located near said second grating, the steps comprising optically superimposing said first and second gratings so that the strips of said second grating also extend along said predetermined direction, directing the output of the superimposed gratings onto said photodetector, moving said second grating together with said photodetector with respect to said first grating along a second direction substantially perpendicular to the direction of said strips, whereby an oscillating intensity waveform is obtained from said one photodetector, and measuring the average frequency of said oscillating intensity waveform, said average frequency being an indication of the applied stress.

2. The method as claimed in claim 1, further comprising the steps of digitizing said oscillating intensity waveform, performing a fast Fourier transform on said oscillating intensity waveform, obtaining an amplitude vs. frequency distribution of said oscillating intensity waveform, and calculating said average frequency from an amplitude peak value of said frequency distribution.

3. The method as claimed in claim 1, further comprising the steps of providing an imaging system having object and image planes, and of substantially locating said first grating in said object plane, and said second grating and said detector in said image plane.

4. The method as claimed in claim 1, further comprising the step of applying said first grating onto the surface of the specimen by cementing it thereon.

5. The method as claimed in claim 1, further comprising the step of applying said first grating onto the surface of the specimen by engraving it thereon.

6. In a method of measuring strain with the aid of a first grating applied onto a surface of a specimen to which a stress is applied, said first grating having alternating dark and bright strips of approximately constant pitch, said strips extending along a predetermined direction, a second grating of a structure substantially similar to that of said first grating, a light source illuminating said gratings, and first and second photodetectors located near said second grating, the steps comprising optically superimposing said first and second gratings so that the strips of said second grating also extend along said predetermined direction, directing the output of the superimposed gratings onto said photodetectors, moving said second grating with respect to said first grating along a second direction substantially perpendicular to the direction of said strips, said photodetectors being spaced at a predetermined distance from one another along said second direction, whereby oscillating intensity waveforms of substantially the same frequency, but of different respective phases are obtained from said photodetectors, and measuring the average difference in said phases, said average difference being indicative of the applied stress.

7. The method as claimed in claim 6, further comprising the steps of providing an imaging system having object and image planes, and of substantially locating said first grating in said object plane, and substantially locating said second grating and said photodetectors in said image plane.

8. The method as claimed in claim 6, further comprising the steps of providing an imaging system having object and image planes, of substantially locating said first grating and said second grating in said object plane, and substantially locating said photodetectors in said image plane.

9. The method as claimed in claim 6, further comprising the step of juxtaposing said first and second gratings.

10. The method as claimed in claim 6, further comprising the step of applying said first grating onto the surface of the specimen by cementing it thereon.

11. The method as claimed in claim 6, further comprising the step of applying said first grating onto the surface of the specimen by engraving it thereon.

12. The method as claimed in claim 6, further comprising the steps of digitizing said oscillating intensity waveforms, performing a fast Fourier transform on said oscillating intensity waveforms, obtaining amplitude vs. frequency, and phase vs. frequency distributions of said oscillating intensity waveforms, and calculating said average phase difference from said distribution, using respective amplitude and phase peak values.

* * * * *